United States Patent [19]

Blake

[11] 4,232,053
[45] Nov. 4, 1980

[54] COOKED COMESTIBLE BASE CONTAINING CITRUS JUICE VESICLES AND METHOD OF PREPARATION

[75] Inventor: Jon R. Blake, Brooklyn Center, Minn.

[73] Assignee: General Mills, Inc., Minneapolis, Minn.

[21] Appl. No.: 43,993

[22] Filed: May 31, 1979

[51] Int. Cl.$^2$ .............................................. A23L 1/212
[52] U.S. Cl. .................................. 426/616; 426/523; 426/658
[58] Field of Search ............... 426/333, 616, 639, 653, 426/660, 661, 506, 519, 523, 810

[56] References Cited

U.S. PATENT DOCUMENTS

| | | | |
|---|---|---|---|
| 2,858,221 | 10/1958 | Laurie | 426/616 |
| 2,865,757 | 12/1958 | Aurell | 426/558 X |
| 2,952,548 | 9/1960 | Work | 426/302 X |
| 3,190,756 | 5/1965 | Aurell | 426/653 X |
| 3,196,020 | 7/1965 | Work | 426/302 |
| 3,246,993 | 4/1966 | Webster et al. | 426/616 |
| 3,365,310 | 1/1968 | Webster | 426/616 |
| 3,998,977 | 12/1977 | Rabeler | 426/616 X |
| 4,096,286 | 6/1978 | Sakakibara et al. | 426/577 |
| 4,117,176 | 9/1978 | Taylor et al. | 426/660 |

OTHER PUBLICATIONS

Kesterson, "Processing & Potential Uses for Dried Juice Sacs", *Food Technology*, pp. 52–54, Feb. 1973.
Ting, "Alcohol–Insoluble Constituents of Juice Vesicles of Citrus Fruit", *Journal of Food Science*, vol. 35, pp. 757–761 (1970).
Nagy et al, "Fatty Acids of Triglycerides from Citrus Juice Sacs", *Phytochemistry, vol. 13, pp. 153–154 (1974)*.
Nagy et al, "Saturated & Mono–Unsaturated Long Chain Hydrocarbon Profiles of Lipids from Orange, Grapefruit, Mandarin & Lemon Juice Sacs", *Lipids*, vol. 7, No. 10, pp. 666–670 (1972).

*Primary Examiner*—Arthur L. Corbin
*Attorney, Agent, or Firm*—Gene O. Enockson; John A. O'Toole

[57] ABSTRACT

Disclosed are food products in the form of a comestible base which contain major amounts of citrus juice residual juice vesicle solids. The comestible bases are formed by first preparing an uncooked blend comprising (1) 25% to 65% citrus juice vesicles having a moisture content between 89% to 96% by weight of the vesicles, (2) 7% to 45% by weight of a nutritive carbohydrate sweetening agent, (3) sufficient edible non-volatile organic acid to provide the blend with a pH between 2.5 to 5.5, (4) 1% to 5% of an ungelatinized starch, and, (5) 8% to 60% added water. The blend prepared by mixing these essential ingredients is cooked at a temperature of between 180° F. and 280° F. to form the present comestible bases. The cooking step results in the comestible base having a moisture content reduced to 30% to 60% and an increased viscosity of up to 7,000 to 10,000 cp. at 190° F. Consistency of the comestible base is alternatively expressed in Bostwick consistometer values of between 7.5 and 9.5 cm. at 190° F.

13 Claims, No Drawings

COOKED COMESTIBLE BASE CONTAINING CITRUS JUICE VESICLES AND METHOD OF PREPARATION

BACKGROUND OF THE INVENTION

1. Field of the Invention

The present invention relates to food products useful as comestible bases and to methods for their preparation. More particularly, the present invention relates to comestible bases containing citrus juice vesicles and to the methods of cooking by which the bases are prepared.

2. The Prior Art

Certain waste materials are produced in the manufacture of orange, grapefruit, lemon, etc., juice from the citrus fruit. For years problems with the disposal of the waste citrus material has prompted attempts to utilize this waste material. Initial screening separates solids material such as peel and seeds from the juice. Generally, the layer material is dried, comminuted, and used for cattle feed. Alternatively, the albedo/peel can be elaborately processed to provide purified pectin useful for jelly, jam and the like.

Finer materials (i.e., pulp) associated with the juice is similarly segregated from the juice by screening. A variety of terms have been loosely used in the art to refer to this pulp material or parts thereof in its various physical or processed forms. It has been called at various times in its untreated state, "juice vesicles", "juice sacs" or "finisher pulp". The juice vesicles are the membranes forming the juice sacs. During juicing operations the juice sacs rupture and release their juice. Thus, for purposes of the present invention, "juice vesicles" is used synonymously for the residual juice sac materials remaining after the release of the juice from the juice sac.

The finisher pulp typically is combined with the peel residue an the mixture is used for cattle feed since the pulp is not a good source of pectin compared to the peel itself. In some instances, the pulp is recovered, frozen and even freeze-dried to be used in dry juice powders which form orange juice drinks when reconstituted with water (see, for example, U.S. Pat. No. 3,246,993 issued Apr. 19, 1966 R. C. Webster et al and U.S. Pat. No. 3,365,310 issued Jan. 20, 1968 to R. C. Webster).

In commercial juice production, the pulp is washed to recover cold water soluble sugars which are present in the pulp material in dilute amounts. Although the cold water soluble sugars are initially present in relatively high concentrations on a dry solids basis (i.e., 30% by weight), on a wet basis the sugars concentration is quite low since the total solids content of the finisher pulp is only 3% to 5%. Some pectin-like materials are also washed away along with the soluble sugars to leave a material referred to as "washed juice vesicles".

Both washed and unwashed juice vesicle material which has been drum dried, spray dried or solvent dried has been suggested for use as a food additive. Such suggested utilization is based upon the excellent water-binding and the good oil-binding properties of the material. One reference (see, "Processing and Potential Uses for Dried Juice Sacs," by J. W. Kesterson and R. J. Braddock, Food Technology, Feb. 1973, pp. 52–54) suggests its utilization in a wide variety of food products but has no teaching of actual use in any food product.

Past efforts have included attempts at utilizing "protopectin" derived from citrus residue including dried vesicles. "Protopectin" is a non-specific term generally denoting insoluble pectinaceous material. For example, several art efforts have been made at incorporating small amounts of dried or treated protopectin into breads or cakes (see, U.S. Pat. Nos. 2,952,548 issued Sept. 13, 1960 to L. T. Work; 3,190,756 issued June 22, 1965 to W. Aurell; and 3,196,020 issued July 20, 1965 to W. Aurell). These patents disclose elaborately treating the protopectin with various lipids or colloid materials to decrease the rate or amount of hydration of the protopectins. Without such treatment, these patents teach that the rapid hydration of these extremely hydrophilic materials causes doughs or batters to set quickly into non-elastic solid masses which are unsuitable for bread or cake production. Alternatively, it has been taught that cakes containing untreated protopectin can be realized by formulating doughs of low gluten flours such as potato flour. (See, for example, U.S. Pat. No. 2,865,757 issued Dec. 23, 1958 to W. Aurell).

Given the above-described problems and difficulties in providing any food products containing even minor amounts of residual juice vesicle material, it is not surprising that few art attempts have realized food products which comprise major amounts of this material. Thus, there is clearly a continuing need for new and useful food products which utilize this previously discarded material and which are organoleptically acceptable for sale as consumer products. Accordingly, it is an object of the present invention to provide edible, multipurpose food products which contain major amounts of residual juice vesicles which are organoleptically acceptable.

It is a further object of the present invention to provide food products employing all of the juice vesicle.

In particular, it is a further object of the present invention to provide food products which do not require employment of dried juice vesicle material.

It has been suprisingly discovered that the above objectives can be realized and superior multipurpose food products provided by cooking, in the prescribed manner, blends of juice vesicles, nutritive sweetening agents, ungelatinized starch, acidulants and water.

SUMMARY OF THE INVENTION

The present invention relates to comestible bases containing major amounts of residual citrus juice vesicles and to their methods of preparation. The comestible bases as prepared herein are useful in the provision of a variety of food products. The present comestible bases are prepared by first blending from about (1) 25% to 65% citrus juice vesicles having a moisture content between about 89% to 96% by weight of the vesicles; (2) from about 7% to 45% by weight of a nutritive carbohydrate sweetening agent; (3) sufficient edible nonvolatile organic acid to provide the blend with a pH of between about 2.5 to 5.5; (4) from about 1% to 5% of an ungelatinized starch; and (5) from about 8% to 60% water. The process mixes prepared by blending these essential components range in viscosity between 3,000 to 6,000 cp. at 190° F. The process mix is cooked at a temperature between 180° and 280° F. to form the present comestible bases. The cooking step results in the comestible base having a moisture content of between 30% to 60%, a viscosity of between 7,000 and 10,000 cp. at 190° F. or Bostwick flow viscosity of between 7.5 and 9.5 cm. at 190° F. and a water activity of between 0.6 and 0.95.

Throughout the specification and claims, percentages and ratios are by weight and temperature in degrees Fahrenheit, unless otherwise indicated.

DETAILED DESCRIPTION OF THE INVENTION

The present invention relates to a comestible base which is useful for the preparation of a wide variety of food products. The present comestible base is prepared by cooking a blend comprising citrus juice vesicles, a nutritive carbohydrate sweetener, an ungelatinized starch, and an edible organic acid and added water. The cooking step is continued until particular moisture contents, and viscosities are achieved.

Each of the comestible base components as well as the composition preparation and composition use are described in detail as follows:

A. Blend Preparation

A process mix or blend is prepared essentially comprising the following:

1. Juice Vesicles

Citrus juice vesicles are the principal component of the presently prepared blend. After cooking the blend as described in detail below, the juice vesicles provide the structuring to the present food comestible base in a manner roughly analagous to the gel-forming properties of such materials as pectin, gelatins and gums, such as alginates and xanthan. The juice vesicles also provide the bulk to the present comestible bases. The juice vesicles are present in amounts of from about 25% to 65% by weight of the uncooked blend. Superior results in terms of structuring ability, for example, are achieved when the vesicles are present at from about 40% to 55%. Best results are obtained when the vesicles are present at from about 47% to 53% of the uncooked blend.

Juice vesicles generally contain 89% to 96% moisture. Thus, when only the solid materials provided by the juice vesicles is considered, the juice vesicles comprise about 2.5% to 6.5% of the present comestible base, preferably about 3.5% to 5.0%, and most preferably about 4.0% to 4.5%.

As noted supra, the juice vesicles have been separated from the juice by simple screening in the manufacture of concentrated citrus juice. Usually, juice vesicles are washed with cold water to remove and to recover some of the soluble sugars. Some pectin-like materials are also washed out along with the soluble sugars leaving relatively pure juice vesicles. Optionally, the juice vesicles are desirably pasteurized by heating to 180° F. or higher for 0.25 hours or longer. Such heating also serves to inactivate pectinase enzymes present in the juice vesicles.

Citrus juice vesicles and their chemistry of composition are well known (see, for example, "Alcohol-Insoluble Constituents of Juice Vesicles of Citrus Fruit," by S. V. Ting, *Journal of Food Science,* Vol. 35 pp. 757–761, (1970); "Fatty Acids of Triglycerides From Citrus Juice Sacs", by S. Nagy and H. E. Nordly, *Phytochemistry,* Vol. 13, pp. 153–154 (1974); or "Saturated and Mono-unsaturated Long Chain Hydrocarbon Profiles of Lipids From Orange, Grapefruit, Mandarin and Lemon Juice Sacs" by S. Nagy and H. E. Nordly, *Lipids,* Vol. 7, No. 10, pp. 666–670 (1972); "Citrus Science and Technology", Vol. 1, Nagy, Shaw & Veldhuis, Avi Publishing Co., NY; each of which is incorporated herein by reference).

A typical anaylsis of citrus juice vesicles useful in the present food compositions is

TABLE I

| Component | Percent (dry basis) |
| --- | --- |
| Pectin | 36% |
| Crude Fiber | 33% |
| Sugar | 16.5% |
| Protein | 10% |
| Ash | 2.75% |
| Fat | 1.75% |

Although the moisture contents of juice vesicles are quite high, the water is tightly bound and not readily removed by mechanical means such as conventional filtration. Juice vesicles having moisture contents below about 89% obtained by partially thermally drying are not contemplated for use herein. While the precise phenomenon is not understood, it is believed that drying of the juice vesicles irreversibly alters their functional properties rendering them unsuitable for use in the present comestible bases as prepared by the present preparation method. And too, attempts at substitution of juice vesicles in the present comestible bases by equivalent amounts of individual material similar to the component analysis of Table I have not proven successful.

In certain uses of the present comestible bases, it is highly desirable to employ homogenized juice vesicles. Homogenized juice vesicles can be prepared using conventional homogenization method and apparatus. Generally, homogenizers are divided into two groups according to the kind of energy introduced to the medium homogenized: (1) rotor or rotorstator systems, e.g., agitators, emulsifying pumps and colloid mills, and (2) pressure systems, e.g., wedge resonators and pressure homogenizers. The pressure homogenizer is predominantly used in food processing since it has the best homogenizing effects. Preferably, such units which are used in the preparation of the homogenized juice vesicles, usefully employed in the present comestible bases, are those homogenizers which are constructed to prevent contamination. Typically, juice vesicles are easily homogenized employing low to high homogenization pressures, e.g. 1,000 to 8,000 p.s.i.g.

Unfortunately, homogenized juice vesicles are not readily amenable to analysis of their particle size distribution due to their partially dissolved/suspended nature and their high viscosity. Sufficient homogenization for the present invention is achieved, however, when the homogenized juice vesicles' organoleptic perception is particle-free or homogeneous, e.g., similar texturally to ketchup. Mixture of juice vesicles and the chemically similar material obtained from citrus fruit albedo can be homogenized to supply the homogenized juice vesicle component herein, since the physical structure of the albedo material and the juice vesicles is modified after homogenization.

Juice vesicles derived from citrus fruits are especially suitable for use herein. Preferably, the vesicles are derived from oranges, but lemon, grapefruit, tangerine or mandarin juice vesicles can also be used.

2. Sweetening Agent

A nutritive carbohydrate sweetening agent is essentially present in the present uncooked blend at about 7% to 45% by weight, preferably at about 25% to 45% and most preferably at about 35% to 42%. The term "nutritive carbohydrate sweetening agent" is used herein to mean those typical sweetening agents conventionally used in food products. Of course, the present nutritive carbohydrate sweetening agents are to be distinguished from non-nutritive carbohydrate sweetening agents such as saccharin, cylamate, and the like. Additionally, the present carbohydrate sweetening agents are to be distinguished from such protein-based sweetening agents as aspartame, thaumatin and monellin.

Suitable materials for nutritive carbohydrate sweetening agents are well known in the art. Examples of such sweetening agents include both monosaccharide and disaccharide sugars such as sucrose, invert sugar, dextrose, lactose, honey, maltose, fructose, maple syrup and corn syrup solids. Preferred nutritive carbohydrate sweetening agents are selected from the group consisting of sucrose, glucose, fructose, corn syrup solids and honey. Highly preferred nutritive carbohydrate sweetening agents are selected from the group consisting of sucrose, corn syrup solids and fructose. Of course, mixtures of the above-noted materials are contemplated herein.

While the above-exemplified sweetening agents are available in highly purified forms, other sources of sweetening agents which are not as highly purified can be used. For example, a relatively inexpensive material such as apple juice powder (or "apple powder" as it is commercially labeled) which is approximately 70% by weight (dry basis) sugars can be employed as a nutritive sweetening agent. If used, such impure sources of sugars are employed at levels based upon their total sugars content. Examples of other suitable materials of this kind include dry fruit, semimoist fruit, fruit purees, fruit juice and fruit nectars. Up to 25% of the nutritive carbohydrate sweetening agent used herein can be supplied by such impure sweetening agents.

3. Acidulants

An edible non-volatile organic acid is another essential ingredient of the uncooked blend. The edible organic acid serves to provide the uncooked blend with a pH of from about 2.5 to about 5.5, preferably from about 3.0 to about 4.3 and most preferably from about 3.8 to about 4.2. Maintenance of the pH of the present cooked base within the above-noted range is essential to the complex vesicle/starch interaction of the present method of preparation. Typically, edible organic acids are employed at levels of from about 0.3% to 4% by weight of the present comestible base.

The present method of comestible base preparation involves cooking the uncooked blend at elevated temperatures for extended periods. Thus, it is essential that the acidulant remain in the blend during the cooking operation rather than being lost through vaporization. Accordingly, the organic acids useful herein should be nonvolatile. For purposes of the present invention, nonvolatile shall mean having a vapor pressure at 280° F. of less than about 50 Torr.

A wide variety of edible nonvolatile organic acids or their sodium salts are known in the food art and are usefully employed herein. Examples of suitable materials useful herein as edible organic acids include citric acid, succinic acid, tartaric acid, malic acid, lactic acid, itaconic acid and adipic acid. Preferred edible nonvolatile organic acid salts include sodium citrate.

4. Ungelatinized Starch

The present uncooked blends also comprise from about 1% to 5% of ungelatinized starch. Better compositions contain from about 1.5% to 3% ungelatinized starch. Best results are achieved when the starch level is about 2% to 2.8%.

Any ungelatinized starch is useful herein. Ungelatinized starch, of course, is starch in the form of granules in contradistinction to gelatinized starch, for example, pregelatinized starch. Starch and its chemistry are well known (see, for example, "Starch: Chemistry and Technology," Vol. 1 & 2, R. L. Whistler and E. F. Paschiall, 1965, 1967, Academic Press, N.Y., incorporated herein by reference) and selection of suitable starch materials will pose no problem to those skilled in the art. Suitable ungelatinized starches include those derived from cereal grains such as corn, sorghum and wheat, and from roots and tubers including arrowroot, tapioca and potatoes. Highly preferred for use herein as the starch ingredient are thin-boiled starches. Thin-boiled starches are modified starches produced by treating aqueous suspensions of starch granules with mineral acid, and which have been neutralized, washed and then dried.

5. Water

The uncooked blend essentially comprises from about 8% to 60% water. Better comestible bases are prepared when the water is present in the uncooked blend at from about 40% to 55%. Best results are achieved when the water is present in the uncooked blend at from about 48% to 52% by weight.

The water which is added and comprises an essential component of the uncooked blend should, of course, be distinguished from the total moisture content of the uncooked blend. Since the juice vesicles comprise about 90% by weight bound water, the present uncooked blend would have high overall moisture levels even without the addition of the essential water component. However, as noted supra, the water associated with the juice vesicles is so tightly bound as to be unavailable for dissolution of the nutritive sweetening agent(s) or for hydration of the ungelatinized starch.

Conventional potable water can be used to supply the water component of the uncooked blend. Thus, the water of course should be clear, free of objectionable taste, color and odor, and of approved bacteriological quality.

Preferably, the water component of the process mix is supplied by distilled water. Distilled water is characterized by reduced water hardness, i.e., lower concentrations of magnesium and calcium ions and reduced carbonates levels.

The blend is prepared by mixing or blending together in any order the juice vesicles, sweetening agents, acidulants, ungelatinized starch and water in such a manner as to achieve a uniform blend. Preferably, the sweetening agent and acidulants are first added to water and agitated until dissolved. Thereafter, the vesicles can be added to solutions with mild agitation until a relatively uniform blend is achieved. Finally, the starch can be slowly added with more vigorous agitation until thoroughly dispersed to form the process blend. Of course, the blending should be done below the gelation temperature of the starch, i.e., less than about 140° F.

The texture of the blend so prepared and its viscosity depend upon the moisture level of the juice vesicles, the level of starch employed and the amount of water added to the process mix. Typically, however, the viscosity will range from about 3,000 to 6,000 cp. when heated to 190° F. as measured by a typical Brookfield viscometer.

Aberrations in viscosity readings due to attachment of some juice vesicles on the spindle of the viscometer can result in erroneous viscosity measurements. Accordingly, an alternate measurement of the consistency of the comestible base is given herein in Bostwick units. The Bostwick consistometer is an instrument commonly used in the food industry to measure the consistency of viscous materials by measuring the distance a material flows under its own weight along a level surface in a given period of time. This instrument is commonly used with food product manufacturers who wish to measure the relative consistency of such products as catsup, jellies, preserves, baby foods, salad dressings and other semi-solid products.

The consistometer consists of a rectangular trough divided in two sections by a spring operated gate assembly. The smaller of the two sections serves as the "reservoir" for the material to be tested. The larger section, which takes up most of the trough serves as the "trap" on which the product flows so that its consistency can be measured. This section is graduated along the bottom in 0.5 cm. divisions, beginning at the gate, over a length of 24 cm.

The gate which divides the trough into two sections rests in the grooves of the two posts extending upward from the sides of the trough. Inside each post is a spring sufficiently compressed to maintain a strong upward force on the gate. While the reservoir is being filled, the gate is held down in a closed position. Pressing at the free end of the trigger releases the gate instantaneously and the gate flies up because of the spring force. Upon opening of the gate, the fluid material flows along the bottom of the trough. The furthest linear extent of the material flow within a specified time is measured and given in Bostwick units having the dimensions of centimeters. Further information is given in "Consistency Tests Made by T.E.A. Garden on Preserves", Western Canner and Packer, Feb. 1939, which is incorporated herein by reference.

The present uncooked blends will have Bostwick flow viscosities between about 8.5 and 10 when heated to 190°. As with the alternate viscosity measurement, the Bostwick flow viscosity will depend upon the moisture level of the juice vesicles, the level of ungelatinized starch employed and the amount of water added to the process mix.

B. Cooking

The uncooked blend as prepared above is then cooked in the present method of comestible base preparation. It is speculated herein that during the cooking step numerous complex and interrelated reactions occur including gelation of the starch, partial plating of the starch onto the fibrous portions of the juice vesicles, conversion of some insoluble pection into soluble pectins, solids concentration increase and sugars hydrolysis. Due to the extremely complex nature of these various reactions, for purposes of the present invention, the cooking step's completion is defined by and determined by two criteria: (1) final moisture content of the comestible base, and (2) the viscosity of the comestible base.

The final moisture content of the comestible bases herein ranges between 30% to 60%. Better results are achieved when the final moisture contents range between 45% and 55%. Best results when the moisture contents range between 48% and 53%.

Moisture is removed from the blend during the present cooking step. The rate of moisture removal is influenced by the pressure and the temperature at which the cooking step is practiced as well as the starch level and the level of water employed to form the uncooked blend. Generally, longer cooking times are required to achieve the essential final moisture contents of the comestible bases when lower cook temperatures and higher water additions to the uncooked blend are used.

The temperature of the process mix during cooking should range between about 180° F. to 280° F. For better results, the cooking temperature should range from about 205° F. and 280° F. Maintenance of the cooking temperature within the above recited ranges is important to completion of the cooking step within a reasonable time as well as avoidance of ingredient degradation. Maintenance of the cooking temperature within the essential ranges is also important to the various interactions of the process mix components and thus the properties of the present comestible bases.

The cooking step can be performed at atmospheric pressure. Alternatively, the cooking step can be performed under pressure. When pressurized cooking is employed, cooking pressures should be less than about 90 p.s.i.g., and preferably less than about 50 p.s.i.g. Of course, when pressurized cooking is used, the pressure cooking apparatus will be equipped with suitable means for moisture removal.

The combination of high cooking pressures and high cooking temperatures substantially reduces the cooking time required to achieve requisite final moisture contents and viscosities. Accordingly, time, per se, is not a critical process parameter of the present cooking step.

The completion of the present cooking step is, in part, determined by the viscosity of the final comestible base. The viscosity of the cooked comestible bases at 190° F. will range between 7,000 and 10,000 centipoise. For better results, the viscosity will range between about 7,000 to 9,000 cp. Best results are obtained when comestible base has a viscosity of between about 7,000 and 8,000 centipoise.

The viscosity of the uncooked blend will generally increase during the cooking step by which the present comestible bases are prepared. The final viscosity of the comestible bases is influenced by the amount of juice vesicles used in the process mix as well as the vesicles' moisture content, the level and type of ungelatinized starch employed, the amount of water added to the uncooked blend, the final moisture content of the comestible base and the temperature and time of the cooking step. Generally higher viscosities are obtained when higher amounts of juice vesicles having lower moisture content are used, higher starch levels, longer cooking times at higher temperatures, and lower final moisture levels of the comestible base. Conversely, lower viscosities are obtained when shorter cooking times at lower temperatures, lower starch levels, higher final moisture contents, lower levels of juice vesicles of higher moisture contents are employed.

For convenience, the final viscosities of the cooking comestible bases prepared by the present method of preparation are alternatively stated in Bostwick units. Thus, the comestible bases of the present invention prepared by the present method have Bostwick viscosities of between 7 and 11 cm at 190° F. Better comestible bases have viscosities of about 8 to 10 cm. For best results, the comestible bases have a viscosity of between about 9 to 10 cm.

Upon completion of the cooking step, the comestible bases of the present invention so prepared can be packaged if desired, in any suitable container including for example, pouches, cans, bottles, and the like. One especially convenient container is a pouch made from high density polyethelene. Generally, no sterilization step is needed prior to packaging of the present comestible bases. The combination of high temperature and low acidity cooking for extended periods generally results in the comestible bases being asceptic. When packaged immediately in plastic pouches, for example, i.e., while still at a temperature exceeding about 190° F., the sealed pouches of comestible bases remain shelf stable and generally free of microbial attack for periods exceeding one year.

The following examples illustrate certain preferred embodiments of the invention and are not intended as limiting the invention. Further utilities for the present cooked comestible bases are found in U.S. patent applications Ser. No. 44,798 and Ser. No. 44,799 filed concurrently herewith.

EXAMPLE I

A comestible base of the present invention is prepared in the following manner:

An uncooked blend having the following formulation is prepared:

| Amount | Ingredient | Weight % |
|---|---|---|
| 830 g. | Citrus juice vesicles[1] | 42.8% |
| 620 g. | Sucrose | 32.0% |
| 41 g. | Ungelatinized starch[2] | 2.1% |
| 1 g. | Citric Acid | 0.05% |
| 450 g. | Water | 23.05% |
| 1,942 g. | | 100.00% |

[1]Juice vesicles obtained from orange juice having an average moisture content of 90% by weight of the juice vesicles.
[2]An ungelatinized modified thin boiled starch marketed by O. K. Brand, (Hubinger Co.) as "Thin-Boil 60".

Such a formulation is prepared by first preparing a dry mix of the sugar, starch and the acid. Then, the unhomogenized juice vesicles are mixed with water in a sauce pan with mild agitation to form a wet mix. The agitation is continued while the dry mix is slowly added to the wet mix. Agitation is continued until the dry mix ingredients are completely dissolved thereby forming the uncooked blend. The blend is then heated with mild agitation to 190° F. A 250 g. sample is taken and analyzed for acidity and for both Brookfield and Bostwick viscosity, and returned to the blend. The pH of the uncooked blend is 4.0 while the Brookfield viscosity was 4,000 cps. and the Bostwick viscosity was 14 centimeters (1.0 min. flow).

The blend is then heated to about 200° F. and cooked in open air to form the comestible base. Samples are periodically withdrawn, analyzed and returned to the blend until the viscosity of the comestible base is about 9,000 cps. at 190° F. Viscosity measurements are taken using a Brookfield HA Viscometer with a No. 3 spindle at 10 RPM. A cooking time of about 40 minutes is required to obtain this viscosity. The comestible base is found to have a Bostwick consistometer value of 9.5 cm. at 190° F. (1.0 min. flow time). The moisture content of the cooked base is determined to be about 50%.

About 1500 g. of the comestible base is prepared by the above-described procedure. The comestible base so prepared is useful in the provision of a wide variety of food products including jams, jellies and fruit toppings for baked goods or ice cream.

Comestible bases of substantially similar physical and organolpetic properties are realized when the citric acid in Example I is replaced with an equivalent amount of malic acid, lactic acid and succinic acid.

EXAMPLE II

A comestible base of the present invention is prepared in the following manner.

An uncooked blend having the following formulation is prepared.

| Amount | Ingredient | Weight % |
|---|---|---|
| 89.82 lb. | Citrus juice vesicles[1] | 44.91% |
| 25.88 | Sucrose | 12.94 |
| 52.82 | Corn syrup[2] | 26.41 |
| 4.22 | Ungelatinized starch[3] | 2.11 |
| 0.72 | Cream of tartar | 0.36 |
| 0.10 | Citric acid | 0.05 |
| 0.10 | Potassium sorbate[4] | 0.05 |
| 26.52 | Water | 13.26 |
| 200.00 lb. | | 100.00% |

[1]Juice vesicles obtained from orange juice having an average moisture content of 91% by weight of the juice vesicles.
[2]A 71% solids (i.e., 36.7° Be)
[3]An ungelatinized wheat starch marketed by General Mills Chemicals, A Henkel Corporation, under the name of Aytex.
[4]An optional mold growth inhibition ingredient.

The juice vesicles are first homogenized at about 6,000 psi. using a Cherry Burk homogenizer at 60° F. at a rate of 12 lb/hour. The homogenized juice vesicles have a consistency similar to fruit puree.

The homogenized juice vesicles are charged into an open Groen Kettle (apx. 40 gal. capacity) equipped with a swept surface type agitator and a steam jacket. Water is then added to the kettle using moderate agitation. Thereafter, the corn syrup is added to form a wet mixture.

A dry blend comprising the starch, sucrose, cream of tartar, citric acid and potassium sorbate is added to the wet mixture with moderate agitation to form the uncooked blend.

The kettle is heated with low pressure steam until the uncooked blend is 190° F. The viscosity of the uncooked blend is determined to be about 4,200 cps.

The blend is then heated to about 260° F. and cooked with moderate agitation to form the comestible base. Samples are periodically withdrawn, analyzed and returned until the viscosity of the comestible base is about 9,500 cps. measured at 190° F. A cooking time of about 2½ hours is required to reach this viscosity. The comestible base is found to have a Bostwick value of 9.5 (60 sec. flow at 190° F.). The moisture content of the base is determined to be about 48% while the pH is about 4.0. The water activity as measured by a Beckman Model SMT is found to be 0.90. About 150 lb. of comestible base are produced by this procedure. Thus, about 50 lb. of water are removed from the blend during cooking to realize the present comestible base.

The comestible base so prepared is also useful in the provision of a wide variety of food products.

Comestible bases of substantially similar physical and organoleptic properties are realized when the starch of Example II is substituted with equivalent amounts of starch derived from rice, sorghum, tapioca and maize.

EXAMPLE III

The following formulation is prepared:

| Ingredient | Weight % |
| --- | --- |
| Comestible base[1] | 56.30% |
| Apple powder[2] | 26.30 |
| Sucrose | 7.51 |
| Corn Syrup | 3.76 |
| Water | 2.00 |
| Gelatin | 3.00 |
| Flavor | 1.00 |
| Color | 0.02 |
| Citric Acid | 0.05 |
| | 100.00% |

[1] The cooked comestible base as prepared in Example II having a moisture content of 50% and a viscosity at 190° F. of 9,000 cps.
[2] Apple powder is a commercially available product comprising dried apple juice and contains approximately 70% by weight sugars.

Approximately 100 g. of the above formulation is mixed in a Hobart Paddle mixer until the ingredients have been dissolved and dispersed and the resulting mixture is homogenous. Thereafter, the formulation is extruded from a Brabender plastic extruder into a suitable edible casing, e.g., collagin. The extrudate temperature is apx. 220° F. The extruder is operated at approximately 13–14 RPM and the mixture has a residence time in the extruder of about 2.5 minutes. The stuffed material is dipped into boiling water or steamed for five minutes to hydrate the outer casing. The encased extrudate is then hung dried for three hours at 160° to 180° F. and cut into sections. The food products which result have a water activity of about 0.68. The food products so formed when consumed exhibit a tender texture similar to licorice.

Food products of substantially similar physical and organoleptic character are realized when in the Example III composition the cooked comestible base is prepared all or part of the sucrose is replaced with an equivalent amount of dextrose, glucose, maltose, maple syrup solids or apple juice powder.

EXAMPLE IV

Raspberry Jam

The following composition is prepared:

| Ingredient | Weight % |
| --- | --- |
| Comestible base | 48% |
| Sucrose | 15% |
| Raspberries | 35% |
| F.D. & C. Red No. 2 (4%) | 1% |
| Imitation Raspberry flavoring | 1% |
| | 100% |

The hot comestible base as prepared in Example I is simply blended together with the sugar, raspberries and color and flavor in a kitchen blender. The raspberry jam is formed which can be used in conventional manner upon cooling to room temperature.

EXAMPLE V

Spoonable Cold Gel-Like Dessert

| Ingredient | Weight % |
| --- | --- |
| Comestible base[1] | 65% |
| Sucrose | 10% |
| Strawberry puree | 24% |
| Color and flavor | 1% |
| | 100% |

[1] The cooked base of Example II except that it is cooked to a final moisture content of about 40% and has a viscosity of 10,000 cps. at 190° F.

Such a formulation is prepared by simple admixing in any order the indicated ingredients. Upon cooling to 38° F. a spoonable, gel-type cold dessert is formed.

EXAMPLE VI

Approximately 130 g. of the comestible base of Example I is blended with approximately 70 g. of crushed pineapple to form a pineapple glaze. The glaze so prepared can be used to top chicken, hams, etc. and baked to form a thick, flavorful cooked glaze. The glaze can be added either before or after cooking.

EXAMPLE VII

Approximately 450 g. of conventional cake batter is poured into a 9½-inch round cake pan. Thereafter, a mixture of 50 g. of the comestible base of Example I is poured directly into the center of the batter-filled cake pan.

The comestible base sinks to the bottom of the pan due to its higher specific gravity without mixing with the batter or spreading along the bottom of the pan. After baking for 30 minutes at 250° F., the finished cake is withdrawn from the oven and allowed to cool in the pan for five minutes. After cooling, the pan is inverted and the cake plus comestible base topping is removed from the pan. The comestible base is spooned from central pool over the outer portion of cake, to completely coat the surface, which acts as the glazing agent, surprisingly without hydrating the cake region adjacent to the comestible base/batter interface. By variation of this method one can form various geometric shaped cake products, in a conventional baking container.

What is claimed is:

1. A process for the preparation of a comestible base, comprising the step of:
    cooking a blend at a temperature of between about 180° F. and 280° F. to form a comestible base having
    1. a moisture content of between about 30% to 60% by weight; and
    2. a Brookfield viscosity of between about 7,000 and 10,000 cp. at 190° F.,
    said blend having a viscosity of between about 3,000 and 6,000 cp. at 190° F. and comprising
    1. from about 25% to 65% by weight of the blend of citrus juice vesicles having a moisture content between about 89% to 96% by weight of the vesicles;
    2. from about 7% to 45% by weight of the blend of a nutritive carbohydrate sweetening agent;
    3. sufficient edible non-volatile organic acid or sodium salts thereof to provide the blend with a pH ranging between about 2.5 to 5.5;
    4. from about 1% to 5% by weight of the blend of an ungelatinized starch;
    5. from about 8% to 60% by weight of the blend of water.

2. The process of claim 1 wherein the cooked comestible base has a moisture content of between about 45% and 55% by weight.

3. The process of claim 2 wherein the blend contains from about 35% to 55% by weight of the citrus juice vesicles.

4. The process of claim 3 wherein the citrus juice vesicles are derived from oranges.

5. The process of claim 4 wherein the blend contains from about 25% to 45% by weight of the nutritive carbohydrate sweetening agent and from about 1.5% to 3% by weight of the ungelatinized starch.

6. The process of claim 5 wherein the cooking occurs at a temperature between about 205° F. to 280° F.

7. The process of claim 6 wherein the citrus juice vesicles are homogenized at pressures of about 1,000 to 8,000 p.s.i.g.

8. The process of claim 7 wherein the cooked comestible base has a Brookfield flow viscosity of between about 7,000 to 9,000 cp. at 190° F.

9. The process of claim 8 wherein the edible nonvolatile organic acid is selected from the group consisting of citric acid, succinic acid, tartaric acid, malic acid, lactic acid, itaconic acid and adipic acid.

10. The process of claim 9 wherein the cooked comestible base has a moisture content of between about 48% to 53% by weight.

11. The process of claim 10 wherein the blend contains from about 35% to 42% by weight of the nutritive carbohydrate sweetening agent and from about 2% to 2.8% by weight of the ungelatinized starch.

12. The process of claim 11 wherein the cooked comestible base has a Brookfield viscosity of between about 7,000 and 8,000 cp. at 190° F.

13. The process of claim 12 wherein the edible nonvolatile organic acid is citric acid.

* * * * *

UNITED STATES PATENT AND TRADEMARK OFFICE
CERTIFICATE OF CORRECTION

PATENT NO. : 4,232,053
DATED : November 4, 1980
INVENTOR(S) : Jon R. Blake

It is certified that error appears in the above-identified patent and that said Letters Patent are hereby corrected as shown below:

Column 1, line 40   - Delete "an" and insert -- and --.

Column 4, line 55   - Delete "Mixture" and insert -- Mixtures --

Column 7, line 59   - Delete "pection" and insert -- pectin --.

Column 10, line 54  - Add -- cm. -- after 9.5.

Column 12, line 32  - Delete "250°F." and insert -- 350°F. --.

Signed and Sealed this

Fifth Day of May 1981

[SEAL]

Attest:

RENE D. TEGTMEYER

Attesting Officer        Acting Commissioner of Patents and Trademarks